US008737805B2

(12) United States Patent  
Asano et al.

(10) Patent No.: US 8,737,805 B2  
(45) Date of Patent: May 27, 2014

(54) METHOD AND APPARATUS FOR PROVIDING STREAM LINKING IN AUDIO/VIDEO MEDIA

(75) Inventors: Hideo Asano, Machida (JP); Daniel James Colegrove, Henderson, NV (US); Akira Kibashi, Kanagawa-ken (JP); Masahiko Sato, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 12/860,891

(22) Filed: Aug. 21, 2010

(65) Prior Publication Data

US 2010/0316353 A1  Dec. 16, 2010

Related U.S. Application Data

(62) Division of application No. 09/670,063, filed on Sep. 26, 2000, now Pat. No. 7,809,879.

(51) Int. Cl.
*H04N 5/76* (2006.01)

(52) U.S. Cl.
USPC .......................................... 386/237; 386/241

(58) Field of Classification Search
USPC ....................................................... 386/241
See application file for complete search history.

(56) References Cited

U.S. PATENT DOCUMENTS

| 4,121,058 A | 10/1978 | Jusko et al. |
| 4,232,365 A | 11/1980 | Englund |
| 4,700,391 A | 10/1987 | Leslie, Jr. et al. |
| 5,214,779 A | 5/1993 | Barker et al. |
| 5,218,706 A | 6/1993 | Komori et al. |
| 5,245,337 A | 9/1993 | Bugajski et al. |
| 5,281,967 A | 1/1994 | Jung |
| 5,363,491 A | 11/1994 | Komori et al. |
| 5,481,687 A | 1/1996 | Goubert et al. |
| 5,611,065 A | 3/1997 | Alferness et al. |
| 5,644,506 A | 7/1997 | Okazaki et al. |

(Continued)

FOREIGN PATENT DOCUMENTS

| CN | 1227029 | 8/1999 |
| JP | 03288359 | 12/1991 |

(Continued)

OTHER PUBLICATIONS

Amendment 1, dated Jun. 2, 2008, for U.S. Appl. No. 09/670,063, filed Sep. 26, 2000, entitled, "Method and Apparatus for Providng Stream Linking in Audio/Video Disk Media", invented by Hideo Asano et al., pp. 1-6.

(Continued)

*Primary Examiner* — Thai Tran  
*Assistant Examiner* — William Tran  
(74) *Attorney, Agent, or Firm* — William K. Konrad; Konrad, Raynes, Davda and Victor LLP

(57) ABSTRACT

A method and apparatus for providing stream linking in audio/video disk media is disclosed. The present invention sets-up an audio/video stream on a disk drive, uses read and write commands for accessing contiguous data and, given an established stream, establishes a linked stream by sending a linked stream request with the number of a primary stream to the drive. The new stream inherits the beginning and ending addresses of the primary stream. Passed pointer detection is enabled for linked stream pointers passing primary stream pointers.

22 Claims, 17 Drawing Sheets

(56) References Cited

U.S. PATENT DOCUMENTS

| | | | |
|---|---|---|---|
| 5,644,677 | A | 7/1997 | Park et al. |
| 5,717,829 | A | 2/1998 | Takagi |
| 5,828,370 | A | 10/1998 | Moeller et al. |
| 5,884,056 | A | 3/1999 | Steele |
| 5,903,264 | A | 5/1999 | Moeller et al. |
| 5,909,569 | A | 6/1999 | Housel, III et al. |
| 5,933,603 | A | 8/1999 | Vahalia et al. |
| 5,958,070 | A * | 9/1999 | Stiffler ............................ 714/13 |
| 5,960,452 | A | 9/1999 | Chi |
| 6,040,953 | A | 3/2000 | Malone et al. |
| 6,304,714 | B1 | 10/2001 | Krause et al. |
| 6,553,455 | B1 | 4/2003 | Asano et al. |
| 6,621,980 | B1 * | 9/2003 | Gould et al. .................. 386/290 |
| 6,711,741 | B2 | 3/2004 | Yeo |
| 6,934,467 | B1 * | 8/2005 | Herz ............................ 386/200 |
| 7,809,879 | B1 | 10/2010 | Asano et al. |

FOREIGN PATENT DOCUMENTS

| | | |
|---|---|---|
| JP | 05114245 | 7/1993 |
| JP | 07264529 | 10/1995 |
| JP | 08180599 | 12/1996 |
| JP | 09330569 | 12/1997 |
| JP | 10056620 | 2/1998 |
| JP | 11308571 | 5/1999 |
| JP | 11196377 | 7/1999 |
| JP | 2000149427 | 5/2000 |
| WO | 9800973 | 1/1998 |
| WO | 9933265 | 7/1999 |

OTHER PUBLICATIONS

Amendment 2, dated Nov. 3, 2008, for U.S. Appl. No. 09/670,063, filed Sep. 26, 2000, entitled, "Method and Apparatus for Providng Stream Linking in Audio/Video Disk Media", invented by Hideo Asano et al., pp. 1-6.

Amendment 3, dated Dec. 3, 2008, for U.S. Appl. No. 09/670,063, filed Sep. 26, 2000, entitled, "Method and Apparatus for Providng Stream Linking in Audio/video Disk Media", invented by Hideo Asano et al., pp. 1-6.

Amendment 4, dated Mar. 19, 2009, for U.S. Appl. No. 09/670,063, filed Sep. 26, 2000, entitled, "Method and Apparatus for Providng Stream Linking in Audionideo Disk Media", invented by Hideo Asano et al., pp. 1-11.

Amendment 5, dated Sep. 4, 2009, for U.S. Appl. No. 09/670,063, filed Sep. 26, 2000, entitled, "Method and Apparatus for Providng Stream Linking in Audio/Video Disk Media", invented by Hideo Asano et al., pp. 1-9.

Amendment 6, dated Jan. 18, 2010, for U.S. Appl. No. 09/670,063, filed Sep. 26, 2000, entitled, "Method and Apparatus for Providng Stream Linking in Audio/Video Disk Media", invented by Hideo Asano et al., pp. 1-10.

Amendment 7, dated May 18, 2010, for U.S. Appl. No. 09/670,063, filed Sep. 26, 2000, entitled, "Method and Apparatus for Providng Stream Linking in Audio/Video Disk Media", invented by Hideo Asano et al., pp. 1-22.

Amendment 8, dated May 19, 2010, for U.S. Appl. No. 09/670,063, filed Sep. 26, 2000, entitled, "Method and Apparatus for Providng Stream Linking in Audio/Video Disk Media", invented by Hideo Asano et al., pp. 1-6.

Office Action, dated Mar. 20, 2008, for U.S. Appl. No. 09/670,063, filed Sep. 26, 2000, entitled, "Method and Apparatus for Providng Stream Linking in Audio/Video Disk Media", invented by Hideo Asano et al., pp. 1-24.

Office Action, dated Dec. 19, 2008, for U.S. Appl. No. 09/670,063, filed Sep. 26, 2000, entitled, "Method and Apparatus for Providng Stream Linking in Audio/Video Disk Media", invented by Hideo Asano et al., pp. 1-4.

Final Office Action, dated Nov. 17, 2009, for U.S. Appl. No. 09/670,063, filed Sep. 26, 2000, entitled, "Method and Apparatus for Providng Stream Linking in Audio/Video Disk Media", invented by Hideo Asano et al., pp. 1-5.

Notice of Allowance, dated Feb. 19, 2010, for U.S. Appl. No. 09/670,063, filed Sep. 26, 2000, entitled, "Method and Apparatus for Providng Stream Linking in Audio/Video Disk Media", invented by Hideo Asano et al., pp. 1-6.

Second Notice of Allowance, dated Jun. 1, 2010, for U.S. Appl. No. 09/670,063, filed Sep. 26, 2000, entitled, "Method and Apparatus for Providng Stream Linking in Audio/Video Disk Media", invented by Hideo Asano et al., pp. 1-5.

Notice to File Corrected Application Papers, dated 2010-0325, for U.S. Appl. No. 09/670,063, filed Sep. 26, 2000, entitled, "Method and Apparatus for Providng Stream Linking in Audio/Video Disk Media", invented by Hideo Asano et al., pp. 1-2.

Advisory Action, dated Nov. 25, 2008, for U.S. Appl. No. 09/670,063, filed Sep. 26, 2000, entitled, "Method and Apparatus for Providng Stream Linking in Audio/Video Disk Media", invented by Hideo Asano et al., pp. 1-3.

Restriction Requirement, dated Aug. 5, 2009, for U.S. Appl. No. 09/670,063, filed Sep. 26, 2000, entitled, "Method and Apparatus for Providng Stream Linking in Audio/Video Disk Media", invented by Hideo Asano et al., pp. 1-6.

* cited by examiner

| Register | 7 | 6 | 5 | 4 | 3 | 2 | 1 | 0 |
|---|---|---|---|---|---|---|---|---|
| Features | \multicolumn{8}{c}{0Bh} |
| Sector Count | \multicolumn{7}{c}{na} | ER |
| Sector Number | \multicolumn{8}{c}{na} |
| Cylinder Low | \multicolumn{8}{c}{na} |
| Cylinder High | \multicolumn{8}{c}{na} |
| Device/Head | obs | na | obs | DEV | \multicolumn{4}{c}{na} |
| Command | \multicolumn{8}{c}{EFh} |

FIG. 7

| Register | 7 | 6 | 5 | 4 | 3 | 2 | 1 | 0 |
|---|---|---|---|---|---|---|---|---|
| Features | 0Dh ||||||||
| Sector Count | na ||||||||
| Sector Number | na ||||||||
| Cylinder Low | Maximum time in milliseconds (lsb) ||||||||
| Cylinder High | Maximum time in milliseconds (msb) ||||||||
| Device/Head | obs | na | obs | DEV | na ||||
| Command | EFh ||||||||

| Register | 7 | 6 | 5 | 4 | 3 | 2 | 1 | 0 |
|---|---|---|---|---|---|---|---|---|
| Features | \multicolumn{8}{c|}{0Eh} |
| Sector Count | \multicolumn{8}{c|}{na} |
| Sector Number | \multicolumn{7}{c|}{na} | ER |
| Cylinder Low | \multicolumn{8}{c|}{Maximum time in milliseconds (lsb)} |
| Cylinder High | \multicolumn{8}{c|}{Maximum time in milliseconds (msb)} |
| Device/Head | obs | na | obs | DEV | \multicolumn{4}{c|}{na} |
| Command | \multicolumn{8}{c|}{EFh} |

1000

1010

| Register | 7 | 6 | 5 | 4 | 3 | 2 | 1 | 0 |
|---|---|---|---|---|---|---|---|---|
| Features | na | | | | | | | |
| Sector Count | na | | | | | | | |
| Sector Number | na | | | | | | | |
| Cylinder Low | na | | | | | | | |
| Cylinder High | na | | | | | | | |
| Device/Head | obs | na | obs | DEV | na | | | |
| Command | FAh | | | | | | | |

| Register | 7 | 6 | 5 | 4 | 3 | 2 | 1 | 0 |
|---|---|---|---|---|---|---|---|---|
| Error | na | na | na | na | na | ABRT | na | na |
| Sector Count | na | | | | | | | |
| Sector Number | na | | | | | | | |
| Cylinder Low | na | | | | | | | |
| Cylinder High | na | | | | | | | |
| Device/Head | obs | na | obs | DEV | na | | | |
| Status | BSY | DRDY | DF | na | DRQ | na | na | ERR |

|   | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | Stream Number |||||||||||||||||
| 1 | Link Stream Number |||||||||||||||||
| 2 | reserved ||||||||||||| Lnk | Wp |
| 3 | reserved |||||||||||||||||
| 4 | Stream Starting LBA |||||||||||||||||
| 5 | |||||||||||||||||
| 6 | |||||||||||||||||
| 7 | |||||||||||||||||
| 8 | Stream Ending LBA |||||||||||||||||
| 9 | |||||||||||||||||
| 10 | |||||||||||||||||
| 11 | |||||||||||||||||
| ... | ... |||||||||||||||||
| 255 | reserved |||||||||||||||||

| Register | 7 | 6 | 5 | 4 | 3 | 2 | 1 | 0 |
|---|---|---|---|---|---|---|---|---|
| Features | na ||||||||
| Sector Count | na ||||||||
| Sector Number | na ||||||||
| Cylinder Low | na ||||||||
| Cylinder High | na ||||||||
| Device/Head | obs | na | obs | DEV | na ||||
| Command | FAh ||||||||

| Register | 7 | 6 | 5 | 4 | 3 | 2 | 1 | 0 |
|---|---|---|---|---|---|---|---|---|
| Error | na | na | na | na | na | ABRT | na | na |
| Sector Count | na | | | | | | | |
| Sector Number | na | | | | | | | |
| Cylinder Low | na | | | | | | | |
| Cylinder High | na | | | | | | | |
| Device/Head | obs | na | obs | DEV | na | | | |
| Status | BSY | DRDY | DF | na | DRQ | na | na | ERR |

| Register | 7 | 6 | 5 | 4 | 3 | 2 | 1 | 0 |
|---|---|---|---|---|---|---|---|---|
| Features | AV Stream Number | | | | | | | |
| Sector Count | na | | | | | | | |
| Sector Number | na | | | | | | | |
| Cylinder Low | na | | | | | | | |
| Cylinder High | na | | | | | | | |
| Device/Head | obs | na | obs | DEV | na | | | |
| Command | FCh | | | | | | | |

| Register | 7 | 6 | 5 | 4 | 3 | 2 | 1 | 0 |
|---|---|---|---|---|---|---|---|---|
| Error | na | na | na | na | na | ABRT | na | na |
| Sector Count | na | | | | | | | |
| Sector Number | na | | | | | | | |
| Cylinder Low | na | | | | | | | |
| Cylinder High | na | | | | | | | |
| Device/Head | obs | na | obs | DEV | na | | | |
| Status | BSY | DRDY | DF | na | DRQ | na | na | ERR |

FIG. 16

| Register | 7 | 6 | 5 | 4 | 3 | 2 | 1 | 0 |
|---|---|---|---|---|---|---|---|---|
| Error | na | na | na | na | na | ABRT | na | na |
| Sector Count | na | | | | | | | |
| Sector Number | na | | | | | | | |
| Cylinder Low | na | | | | | | | |
| Cylinder High | na | | | | | | | |
| Device/Head | obs | na | obs | DEV | na | | | |
| Status | BSY | DRDY | DF | na | DRQ | na | na | ERR |

FIG. 17

| Register | 7 | 6 | 5 | 4 | 3 | 2 | 1 | 0 |
|---|---|---|---|---|---|---|---|---|
| Features | AV Stream Number | | | | | | | |
| Sector Count | Function Code | | | | | | | |
| Sector Number | LBA | | | | | | | |
| Cylinder Low | LBA | | | | | | | |
| Cylinder High | LBA | | | | | | | |
| Device/Head | obs | LBA | obs | DEV | LBA | | | |
| Command | C3h | | | | | | | |

FIG. 18

| Value in Sector Count | Action |
|---|---|
| 0 | Set the Read AV Pointer |
| 1 | Set the Write AV Pointer |
| 2 | Return the Read AV Pointer |
| 3 | Return the Write AV Pointer |
| 4-255 | Reserved |

FIG. 19

| Register | 7 | 6 | 5 | 4 | 3 | 2 | 1 | 0 |
|---|---|---|---|---|---|---|---|---|
| Error | Stream Number ||||||||
| Sector Count | Function Code ||||||||
| Sector Number | LBA ||||||||
| Cylinder Low | LBA ||||||||
| Cylinder High | LBA ||||||||
| Device/Head | obs | LBA | obs | DEV | LBA ||||
| Status | BSY | DRDY | DF | na | DRQ | na | na | ERR |

FIG. 20

| Register | 7 | 6 | 5 | 4 | 3 | 2 | 1 | 0 |
|---|---|---|---|---|---|---|---|---|
| Error | na | na | na | na | na | ABRT | na | na |
| Sector Count | na ||||||||
| Sector Number | na ||||||||
| Cylinder Low | na ||||||||
| Cylinder High | na ||||||||
| Device/Head | obs | na | obs | DEV | na ||||
| Status | BSY | DRDY | DF | na | DRQ | na | na | ERR |

FIG. 21

| Register | 7 | 6 | 5 | 4 | 3 | 2 | 1 | 0 |
|---|---|---|---|---|---|---|---|---|
| Features | AV Stream Number |||||||| — 2220 |
| Sector Count | Sector count ||||||||
| Sector Number | Relative Address ||||||||
| Cylinder Low | Relative Address ||||||||
| Cylinder High | Relative Address ||||||||
| Device/Head | obs | LBA | obs | DEV | Relative Address |||| — 2240 |
| Command | CEh |||||||| — 2210 |

| Register | 7 | 6 | 5 | 4 | 3 | 2 | 1 | 0 |
|---|---|---|---|---|---|---|---|---|
| Error | na | | | | | | | |
| Sector Count | na | | | | | | | |
| Sector Number | LBA | | | | | | | |
| Cylinder Low | LBA | | | | | | | |
| Cylinder High | LBA | | | | | | | |
| Device/Head | obs | na | obs | DEV | LBA | | | |
| Status | BSY | DRDY | DF | na | DRQ | na | PP | ERR |

| Register | 7 | 6 | 5 | 4 | 3 | 2 | 1 | 0 |
|---|---|---|---|---|---|---|---|---|
| Error | ICRC | WP | MC | IDNF | MCR | ABRT | NM | na |
| Sector Count | na | | | | | | | |
| Sector Number | na | | | | | | | |
| Cylinder Low | na | | | | | | | |
| Cylinder High | na | | | | | | | |
| Device/Head | obs | na | obs | DEV | na | | | |
| Status | BSY | DRDY | DF | na | DRQ | na | na | ERR |

| Register | 7 | 6 | 5 | 4 | 3 | 2 | 1 | 0 |
|---|---|---|---|---|---|---|---|---|
| Features | AV Stream Number | | | | | | | |
| Sector Count | Sector count | | | | | | | |
| Sector Number | Relative Address | | | | | | | |
| Cylinder Low | Relative Address | | | | | | | |
| Cylinder High | Relative Address | | | | | | | |
| Device/Head | obs | LBA | obs | DEV | Relative Address | | | |
| Command | CFh | | | | | | | |

| Register | 7 | 6 | 5 | 4 | 3 | 2 | 1 | 0 |
|---|---|---|---|---|---|---|---|---|
| Error | na | | | | | | | |
| Sector Count | na | | | | | | | |
| Sector Number | na | | | | | | | |
| Cylinder Low | na | | | | | | | |
| Cylinder High | na | | | | | | | |
| Device/Head | obs | na | obs | DEV | na | | | |
| Status | BSY | DRDY | DF | PP | DRQ | na | na | ERR |

| Register | 7 | 6 | 5 | 4 | 3 | 2 | 1 | 0 |
|---|---|---|---|---|---|---|---|---|
| Error | ICRC | WP | MC | IDNF | MCR | ABRT | NM | DFER |
| Sector Count | na | | | | | | | |
| Sector Number | LBA | | | | | | | |
| Cylinder Low | LBA | | | | | | | |
| Cylinder High | LBA | | | | | | | |
| Device/Head | obs | na | obs | DEV | LBA | | | |
| Status | BSY | DRDY | DF | na | DRQ | na | na | ERR |

METHOD AND APPARATUS FOR PROVIDING STREAM LINKING IN AUDIO/VIDEO MEDIA

BACKGROUND OF THE INVENTION

1. Field of the Invention

This invention relates in general to a method and apparatus for processing audio/video information, and more particularly to a method and apparatus for providing stream linking in audio/video disk media.

2. Description of Related Art

Advancements in communications technology and increased consumer sophistication have challenged the distributors of multimedia programming to provide the subscribing public with entertainment services more convenient and accessible than those traditionally made available over cable television and telephone systems. An improving communications infrastructure has resulted in a proliferation of pay-per-view media services in many of the larger broadcast markets. Most pay-per-view systems permit the consumer to choose from a relatively small number of motion picture selections for home viewing, with the selected programs generally being presented only at pre-scheduled viewing times.

In recent years, the media industry has expanded its horizons beyond traditional analog technologies. Audio, photographs, and even feature films are now being recorded or converted into digital formats. To encourage compatibility between products, standard formats have been developed in many of the media categories.

As would be expected, the viewers of digital video desire the same functionality from the providers of digital video as they now enjoy while watching analog video tapes on video cassette recorders. For example, viewers want to be able to make the video jump ahead, jump back, fast forward, fast rewind, slow forward, slow rewind and freeze frame.

Various approaches have been developed to provide non-sequential playback of digital video data. With respect to digital video data, non-sequential playback refers to any playback operation that does not play all of the encoded frames in the exact order in the sequence in which they were encoded. For example, jump ahead and fast forward operations are non-sequential in that some frames are skipped. Rewind operations at any speed are non-sequential in that during a rewind operation, frames are not played in the sequence in which they are encoded.

Data used for Audio/Video (AV) applications is typically stored in contiguous areas on disk drives and accessed sequentially. Computer systems access disk drives by logical block number. For digital Audio/Video applications it is useful to refer to the data structure for disk drives as a stream. A stream is a range of addresses on the disk media in which a contiguous area of Audio/Video data is stored. AV applications stream data on and off disk drives by writing contiguous blocks, which are typically linear streams of data.

The ATA (Advanced Technology Attachment) Interface is the dominant storage interface for personal computers. ATA was originally defined as a standard for embedded fixed disk storage on IBM AT™ compatible personal computers. AT™ stands for "Advanced Technology", which refers primarily to it's then "revolutionary" 16-bit bus. In recent years ATA-3 and ATA-4 have enhanced the functionality of the ATA interface to increase performance and interface a wider range of personal computer storage devices.

The ATA command set is designed for random access to blocks of data. The design of Audio/Video products which use ATA hard disk drives would be simplified by providing a stream oriented AV command system. In a system for addressing Audio/Video (AV) data using contiguous areas called streams, it may be useful to quickly set up additional reading or writing locations in streams that have been previously established. An easy way to do this is to have a linked stream capability.

It can be seen then that there is a need for a method and apparatus that provides stream linking in audio/video disk media.

SUMMARY OF THE INVENTION

To overcome the limitations in the prior art described above, and to overcome other limitations that will become apparent upon reading and understanding the present specification, the present invention discloses a method and apparatus for providing stream linking in audio/video disk media.

The present invention solves the above-described problems by setting-up an audio/video stream on a disk drive, using read and write commands for accessing contiguous data and, given an established stream, a linked stream is established by sending a linked stream request with the number of a primary stream to the drive. The new stream inherits the beginning and ending addresses of the primary stream. Passed pointer detection is enabled for linked stream pointers passing primary stream pointers.

A method in accordance with the principles of the present invention includes when additional reading or writing locations in streams are desired, sending a linked stream request with a number of a primary stream, initiating a linked stream that is linked to the primary stream, setting a pointer for the linked stream to the same location as a pointer for the primary stream and during operation, processing the pointers for both the linked stream and the primary stream.

Other embodiments of a method in accordance with the principles of the invention may include alternative or optional additional aspects. One such aspect of the present invention is that the setting of a pointer for the linked stream to the same location as a pointer for the primary stream further comprises setting a read audio/video pointer for the linked stream to the same location as the read audio/video pointer of the primary stream.

Another aspect of the present invention is that the linked stream inherits a beginning and ending address from the primary stream.

Another aspect of the present invention is that the linked stream and the primary stream each include a read audio/video pointer and a write audio/video pointer.

Another aspect of the present invention is that a passed pointer warning is set when the linked stream read AV pointer passes the primary stream write AV pointer.

Another aspect of the present invention is that a stream may not be linked to a linked stream.

Another aspect of the present invention is that the linked stream is disabled when the primary stream is disabled.

Another aspect of the present invention is that the linked stream and the primary stream may be read and written to simultaneously.

Another aspect of the present invention is that the linked stream and the primary stream each include a read audio/video pointer and a write audio/video pointer.

Another aspect of the present invention is that the read audio/video pointer points to the next sector to read from and the write audio/video pointer points to the next sector to write to.

Another aspect of the present invention is that the method further includes moving the pointers with a command.

In another embodiment of the present invention, a remote multimedia server is provided. The remote multimedia server includes a mass storage library for storing a plurality of multimedia programs each segmented into at least one audio/video stream, transmission means for transmitting the at least one audio/video stream to a communication channel and a local media control system, including a direct access storage device including at least one data storage disk and a controller for processing the coordinating writing of the at least one audio/video stream received from the communication channel to the data storage disk, and for coordinating reading of the at least one audio/video stream from the data storage disk, the controller providing stream linking in audio/video disk media by sending a linked stream request with a number of a primary stream when additional reading or writing locations in streams are desired, initiating a linked stream that is linked to the primary stream, setting a pointer for the linked stream to the same location as a pointer for the primary stream, and, during operation, processing the pointers for both the linked stream and the primary stream.

In another embodiment of the present invention, a direct access storage device is provided. The direct access storage device includes at least one data storage disk and a controller for processing the coordinating writing of the at least one audio/video stream received from the communication channel to the data storage disk, and for coordinating reading of the at least one audio/video stream from the data storage disk, the controller further providing stream linking in audio/video disk media by sending a linked stream request with a number of a primary stream when additional reading or writing locations in streams are desired, initiating a linked stream that is linked to the primary stream, setting a pointer for the linked stream to the same location as a pointer for the primary stream, and, during operation, processing the pointers for both the linked stream and the primary stream.

In another embodiment of the present invention, an article of manufacture is provided. The article of manufacture includes a program storage medium readable by a computer, the medium tangibly embodying one or more programs of instructions executable by the computer to perform a method for providing stream linking in audio/video disk media, the method includes when additional reading or writing locations in streams are desired, sending a linked stream request with a number of a primary stream, initiating a linked stream that is linked to the primary stream, setting a pointer for the linked stream to the same location as a pointer for the primary stream and during operation, processing the pointers for both the linked stream and the primary stream.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 7 illustrates the enable read continuous mode subcommand;

FIG. 8 illustrates the enable Time-based Read Error Recovery Procedure Limitation subcommand having code 0Dh;

FIG. 9 illustrates the enable Time-based Write Error Recovery Procedure Limitation subcommand having code 0Eh;

FIG. 10 illustrates the registers and the field DEV for indicating the selected device;

FIG. 11 illustrates the error outputs for the AV stream addresses;

FIG. 12 illustrates a table for the data format used for setting the AV stream addresses according to the present invention;

FIG. 13 illustrates the inputs for disabling the AV stream;

FIG. 14 illustrates the error outputs when disabling the AV stream;

FIG. 15 illustrates the inputs for reading the AV stream addresses;

FIG. 16 illustrates the normal outputs when reading the AV stream addresses;

FIG. 17 illustrates the error outputs when reading the AV stream addresses;

FIG. 18 illustrates the inputs for setting/reading AV pointers;

FIG. 19 is a table illustrating the read/write AV write pointer or AV read pointer;

FIG. 20 illustrates the normal outputs when setting/reading AV pointers;

FIG. 21 illustrates the error outputs when setting/reading AV pointers;

FIG. 22 illustrates the read DMA AV stream command;

FIG. 23 illustrates the normal outputs when readying DMA AV stream commands;

FIG. 24 illustrates the error outputs when readying DMA AV stream commands;

FIG. 25 illustrates the write DMA AV stream command;

FIG. 26 illustrates the normal outputs for the write DMA AV stream command;

FIG. 27 illustrates the error outputs for the write DMA AV stream command; and

DETAILED DESCRIPTION OF THE INVENTION

Figure 1:
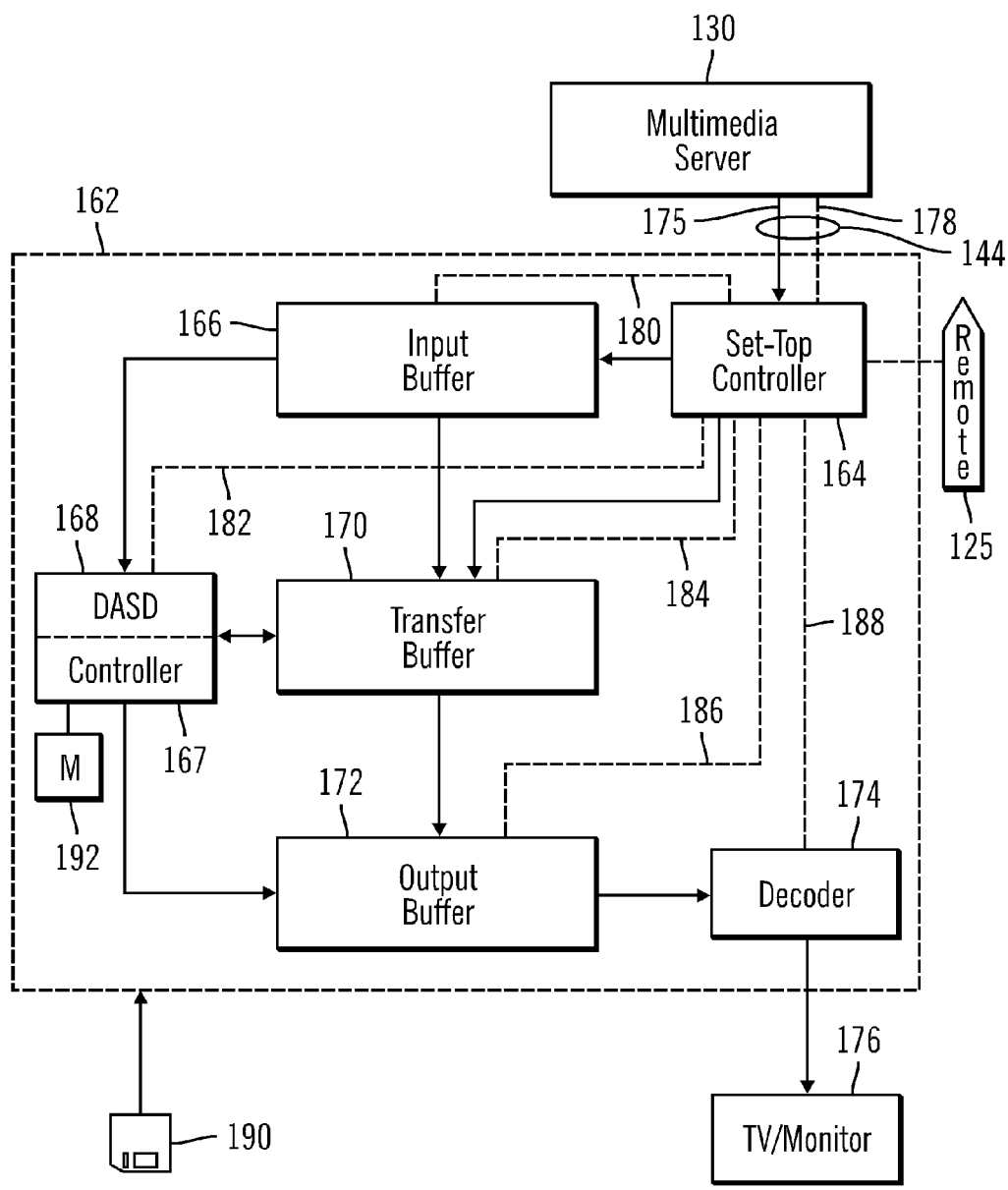
FIG. 1 illustrates a system block diagram of a novel intelligent set-top control system adapted for communicating with a remote multimedia server.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing stream linking in audio/video disk media. The present invention sets-up an audio/video stream on a disk drive, uses read and write commands for accessing contiguous data and, given an established stream, establishes a linked stream by sending a linked stream request with the number of a primary stream to the drive. The new stream inherits the beginning and ending addresses of the primary stream. Passed pointer detection is enabled for linked stream pointers passing primary stream pointers Referring now to FIG. 1, there is illustrated a system block diagram 100 of a novel intelligent set-top control system 162 adapted for communicating with a remote multimedia server 130 preferably of the type described hereinabove. In accordance with one embodiment, a relatively low-cost set-top control system 162 configuration includes a moderate amount of local memory for receiving an audio/video stream transmitted from the multimedia server 130 over a communication channel 144. The set-top control system 162 may include a set-top controller 164 that communicates with an input buffer 166, output buffer 172, and a decoder 174 to coordinate decoding of the received audio/video stream for presentation on a local monitor or television 176.

The set-top control system 162 includes a novel multimedia direct access storage device (DASD) 168 adapted to buffer audio/video streams representative of a portion or all of a multimedia program received from a communication channel 144. An important feature afforded a subscribing customer when employing a set-top control system 162 in accordance with this embodiment concerns the capability to effectuate full local VCR-type control over the presentation of a portion of a selected multimedia program on a real-time basis. Full VCR-type control over the presentation of the entire multimedia program may also be realizable provided a sufficient amount of DASD 168 storage capacity is allocated for this purpose. The amount of available DASD 168 storage capacity generally impacts the degree to which a subscribing customer can effectuate VCR-type control over the presentation of a selected multimedia program.

With further reference to FIG. 1, the set-top controller 164 of the set-top control system 162 preferably communicates with a remote multimedia server 130 over a communication channel 144, and coordinates the operation of the set-top control system 162. Media-on-demand data is generally transmitted from the multimedia server 130 to the set-top control system 162 over the communication channel 144 at a very high burst data rate. The set-top controller 164 preferably communicates with other components of the set-top control system 162 to coordinate the reception, storage, and decoding of audio/video streams received from the multimedia server 130, and the presentation of the decoded audio/video stream on a subscribing customer's television 176. The set-top controller 164 preferably communicates control signals to the multimedia server 130 over a server control line or channel 178 of the communication channel 144 to initiate transmission of, for example, a pay-per-view multimedia program. During the presentation of a multimedia program, for example, the viewer may temporarily stop, reverse, or fast forward the presentation of a program by communicating a pause command to the set-top control system 162, typically by use of an IR remote control handset 125.

Figure 2:
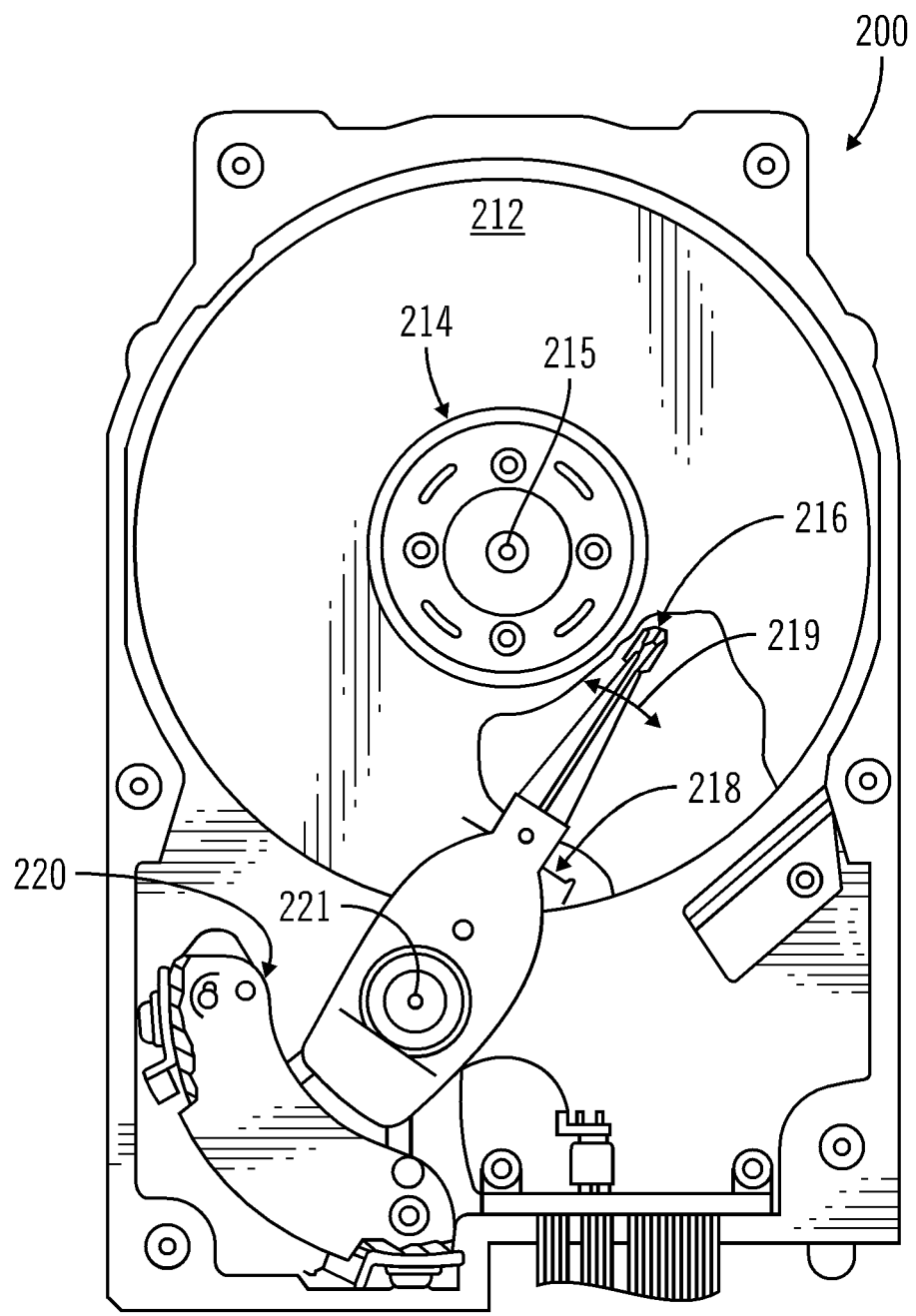
FIG. 2 is a plan view of a disk drive.

FIG. 2 is a plan view of a disk drive 200. Disk drive 200 includes a disk pack 212, which is mounted on a spindle motor (not shown) by a disk clamp 214. Disk pack 212, in one preferred embodiment, includes a plurality of individual disks which are mounted for co-rotation about a central axis 215. Each disk surface on which data is stored has an associated head gimbal assembly (HGA) 216 which is mounted to at least one actuator assembly 218 in disk drive 200. An actuator assembly as shown in FIG. 2 is of the type known as a rotary moving coil actuator and includes a voice coil motor (VCM) shown generally at 220. A voice coil motor 220 rotates an actuator assembly 218 with its attached HGAs 216 about a pivot axis 221 to position HGAs 216 over desired data tracks on the associated disk surfaces, under the control of electronic circuitry housed within disk drive 200.

More specifically, an actuator assembly 218 pivots about axis 221 to rotate head gimbal assemblies 216 generally along an arc 219 which causes each head gimbal assembly 216 to be positioned over a desired one of the tracks on the surfaces of disks in disk pack 212. HGAs 216 can be moved from tracks lying on the innermost radius, to tracks lying on the outermost radius of the disks. Each head gimbal assembly 216 has a gimbal which resiliently supports a slider relative to a load beam so that the slider can follow the topography of the disk. The slider, in turn, includes a transducer which is utilized for encoding flux reversals on, and reading flux reversals from, the surface of the disk over which it is flying.

As described above, digital audio and video data are typically linear streams of data. The ATA command set, (AT Attachment), a disk drive implementation that integrates the controller on the disk drive itself, is designed for random access to blocks of data. The design of audio/video products which use ATA hard disk drives would be simplified by providing a stream oriented AV command system. This requires commands for establishing, controlling, reading, and writing multiple AV streams on ATA devices. In addition to stream management, controls for error recovery procedure time and cache management would be needed. Moreover, an AV Stream Feature set for ATA interface Hard Disk Drives should include:

1. A stream oriented Read/Write commands
    AV Data is frequently accessed linearly with forward and backward searching. The AV data access pattern should be reflected in the commands used to access AV data.
2. Independent Stream LBA support
    AV devices require multiple simultaneous reading and writing streams.
3. Limited time for retries for read/write errors
    Error Recovery Procedure time must be limited to prevent buffer under-run. The time limit for ERP must be flexible as different applications use different data rates and buffer sizes.
4. Suppression ECC errors during read (Read Continuous)
    Some AV applications prefer continuous data transfer to time consuming ERP.
5. Error Reporting for the Read Continuous operation
    Even though uncorrected ECC error data is transferred without ERP in Read Continuous the host may need to know if uncorrected ECC data was passed.
6. Error Reporting for Cached Write operations with Time-Limited ERP. When write ERP is time limited the probability that a cached write will not be successfully completed. It is important to have a mechanism to report cached write failures so the host system know some data previously written has been lost.
7. AV (Single) Write Cache (Cache Depth of one.)
    A mode restricting the write cache to one command at a time simplifies the problem of reporting cached write failures.
8. A transfer size of greater than 256 sectors
    The Big LBA proposal covers this need.
9. Variable Write Cache Segment Size and Multiple Segment
    Read Cache Configuration for Multiple Streams The number and type of AV streams should control cache management.

Figure 3:
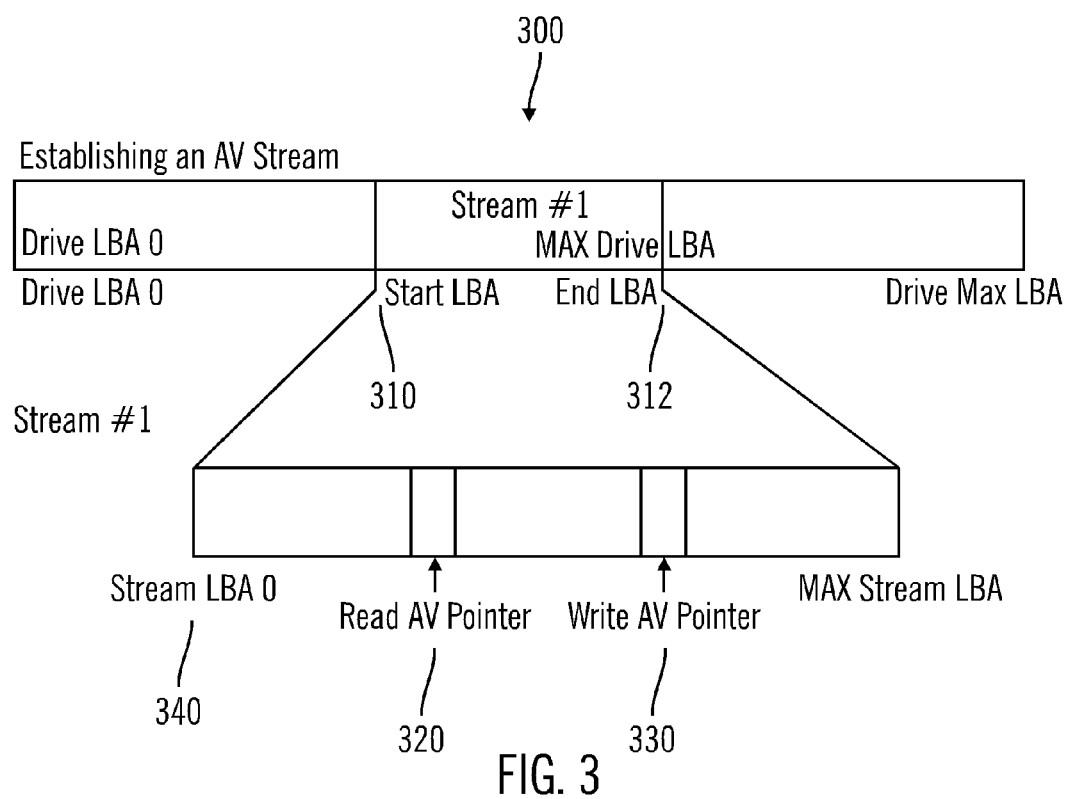
FIG. 3 illustrates an AV stream according to the present invention.

The commands defined in the current ATA standard are designed to handle data for computers which are used in Information Technology (IT) oriented applications. Data integrity is the most important factor in IT applications. For Audio/Video (AV) data, on the other hand, the data rate is also an important factor. The data integrity of AV data may be sacrificed to some extent to maintain the required data rate. FIG. 3 illustrates an AV stream 300 according to the present invention. AV applications use series of data in time per source: an AV Stream. An interface that allows easy stream access is needed for AV applications. Based on AV Stream data characteristics, two stream-oriented data access commands are provided for users of AV applications, Read DMA AV Stream and Write DMA AV Stream.

The Set AV Stream Addresses command sets up an AV Stream for reading and writing. The starting 310 and ending 312 LBAs are passed in a single sector of data. Each stream has two pointers, a Read AV Pointer and a Write AV Pointer 300. The pointers point to the next sector to be read or written, respectively.

The Read Pointer 320 and Write Pointer 330 are initialized to point to Stream LBA 0 340. In FIG. 3, the pointers have been moved using the Set/Read AV Pointers Command or the Read or Write DMA AV Stream Commands. Thus, up to 256 simultaneous overlapping streams may be defined. If during a read or write operation a pointer is moved forward or backward past the other pointer, the Passed Pointer Warning bit is set in a Status Register. This feature is used when playing and recording simultaneously. Reversing or Fast Forwarding the play stream's Read AV Pointer 320 past the Write AV Pointer 330 would result in a sudden time jump. All streams are disabled on hard reset, power on reset, or Set Features Disable AV Stream Mode.

Figure 4:
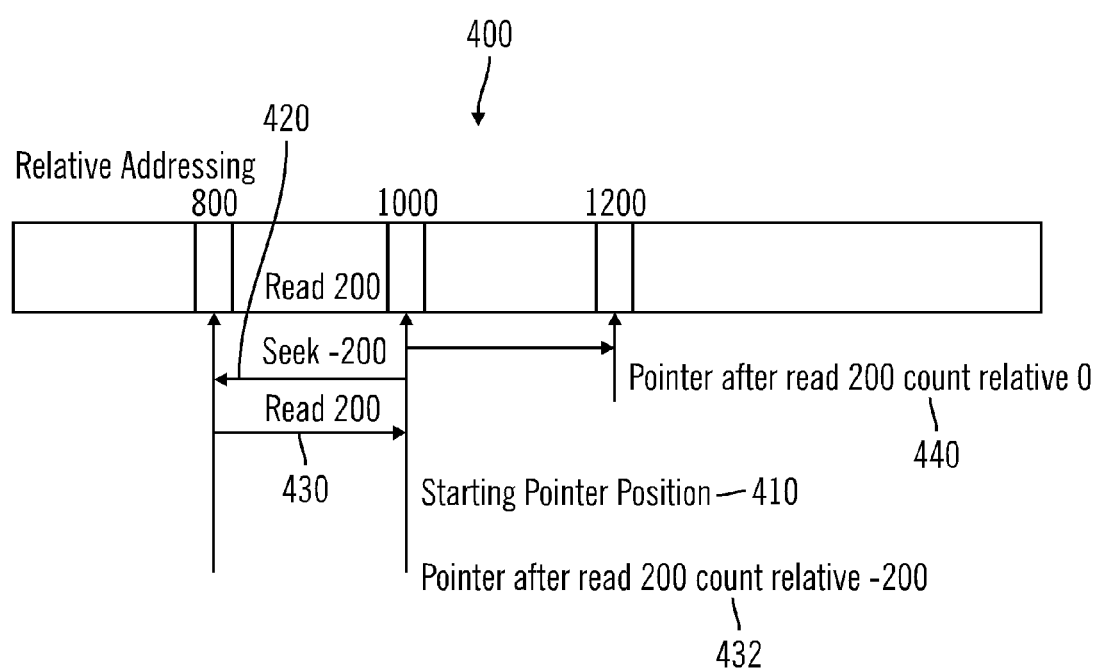
FIG. 4 illustrates relative addressing for the read and write AV stream commands according to the present invention.

FIG. 4 illustrates relative addressing 400 for the read and write AV stream commands according to the present invention. The location of the next read is based on the location of the last read or write. The Pointers point to the next LBA after the last operation. To do continuous reads or writes the host need only specify the length and a relative address of 0. The Wrap bit, set during the Set AV Stream Addresses command, determines if the write or read pointer wrap around the at the ends of the stream data area. In FIG. 4, a portion is set to a starting point position 410, i.e. at LBA 1000. After a seek -200 420, the pointer would point to LBA 800. A read 200 430 would set the pointer at LBA 1000 with a count relative -200 432. If instead of seek 200, another read 200 was performed, the pointer would be LBA 1200 and pointer set at count relative 0 440.

Multiple streams may be assigned to the same drive LBA range. To facilitate multiple play operation while recording in a single LBA range streams may be linked. A linked stream is initialized to the primary streams LBA range and read pointer positions. Linked streams do not have a Write AV pointer, Write DMA AV Stream commands to a linked stream are aborted. The Passed Pointer Warning is set when the Linked streams pointers pass the associated pointer in the primary stream. For example, if stream 1 is initiated with drive LBA range 2000 to 2999, stream 2 is initiated as a stream linked to stream 1. Stream 2 is initialized to LBA range 2000 to 2999. The Stream 2 Read AV Pointer is set to the same locations as the Stream 1 Read AV pointer. If the Stream 2 Read AV Pointer passes the Stream 1 Write AV Pointer a Passed Pointer Warning is set. Further, a stream may not be linked to a linked stream. When a linked stream's primary stream is disabled all subsidiary linked streams are disabled.

Figure 5:
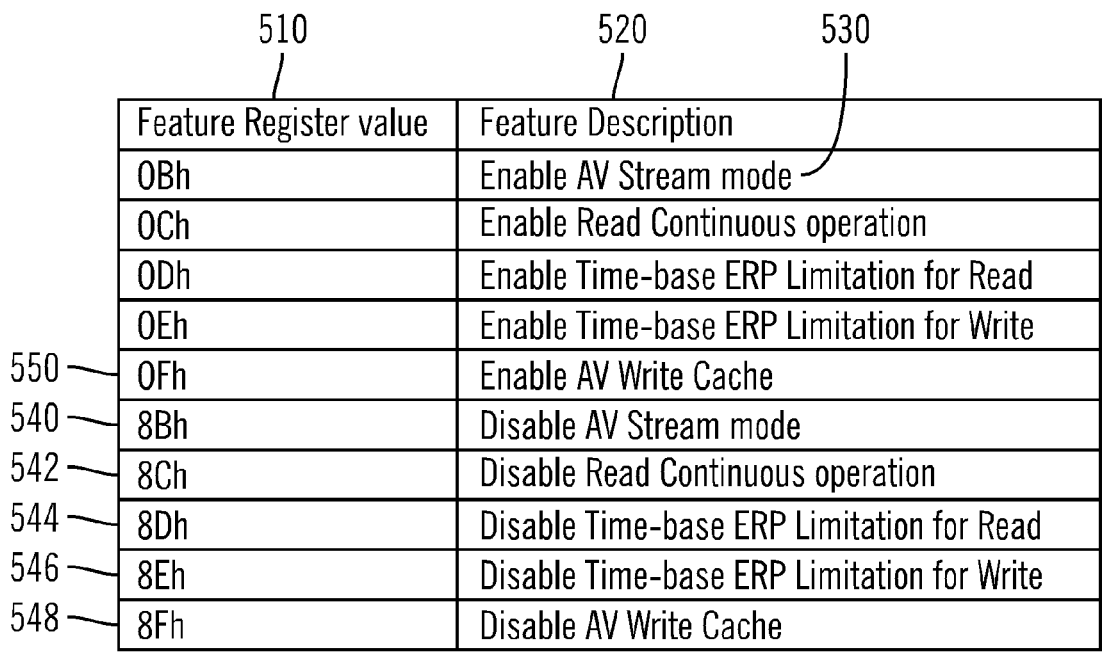
FIG. 5 illustrates a table of the AV stream set feature functions.

FIG. 5 illustrates a table 500 of the AV stream set feature functions. Prior to AV Stream operations the host enables the AV Stream features with Set Features Command Functions. The table 500 includes the register values for each feature 510 and a description for each feature 520. Each feature 520 will be described herein below. The first function illustrated is the enable AV stream mode 530.

Figure 6:
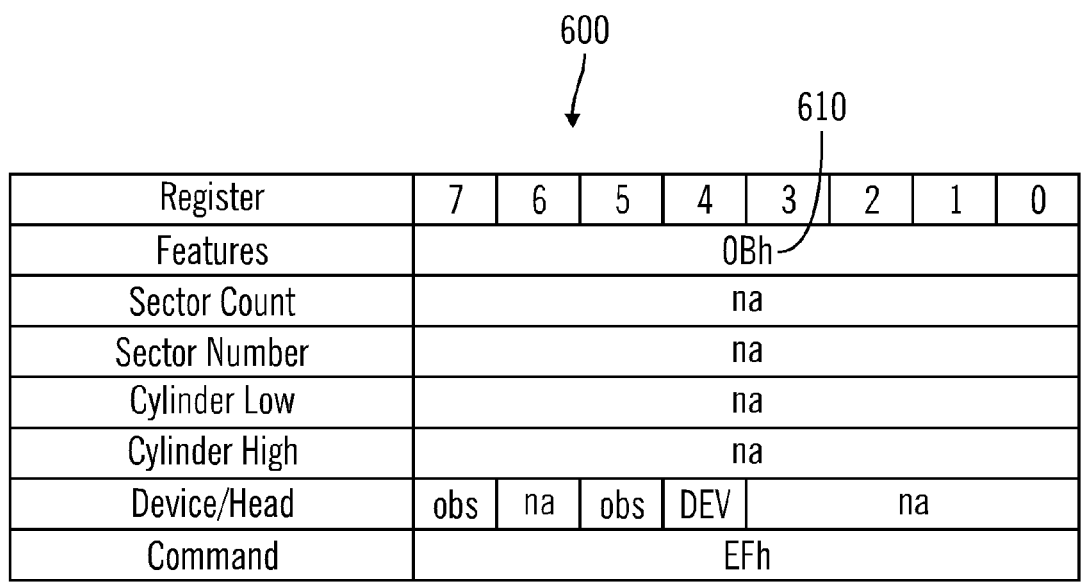
FIG. 6 illustrates the disable AV stream mode subcommand.

FIG. 6 illustrates the enable AV stream mode subcommand 600. The 8Bh subcommand then disables the AV Stream mode in devices that implement AV feature set (see 540 in FIG. 5). Subcommand code 0Bh 610 allows the host to enable Read Continuous mode in devices that implement Read Continuous function. In Read Continuous mode uncorrected ECC errors are passed to the host. Uncorrected ECC errors are reported at the end of the command if the ER bit is set to 1. Non ECC error recovery behavior is controlled by the Enable Time-base Read Error Recovery Procedure Limitation feature (discussed below). Read Continuous takes precedence over the Time-base Read Error Recovery Procedure Limitation. When Read Continuous is enabled uncorrected read data is transferred without invoking ERP.

FIG. 7 illustrates the enable read continuous mode subcommand 700. Subcommand code 0Ch 710 allows the host to enable Read Continuous mode. Subcommand code 0Ch allows the host to disable Read Continuous mode in devices that implement Read Continuous function (see 542 in FIG. 5). ER 720, bit 0, shall be set to one to report uncorrected ECC errors at the end of command. Subcommand code 0Ch 710 allows the host to enable Time-base Error Recovery Procedure Limitation for read operations. The maximum time in milliseconds allocated for Error Recovery Procedures per command is transferred in the Sector Count register.

FIG. 8 illustrates the enable Time-based Read Error Recovery Procedure Limitation subcommand 800 having code 0Dh 810. The cylinder low field 820 sets the least significant byte of the maximum time allowed for Error Recovery Procedures 822, in milliseconds per command. The cylinder high field 830 sets the most significant byte of the maximum time allowed for Error Recovery Procedures 832, in milliseconds per command. Subcommand code 8Dh allows the host to disable Time-base Error Recovery Procedure Limitation for read operations (see 544 in FIG. 5).

FIG. 9 illustrates the enable Time-based Write Error Recovery Procedure Limitation subcommand 900 having code 0Eh 910. Subcommand code 0Eh 910 allows the host to enable Time-base Error Recovery Procedure Limitation for write operations. The maximum time in milliseconds allocated for Error Recovery Procedures per command is transferred in the Sector Count register 912. Setting sector number 914 bit 0, ER 916, to one returns the deferred error information from previous cached write commands during Time-base Write ERP Limitation at the end of write command. The cylinder low register 920 is used to set the least significant byte of the maximum time allowed for Error Recovery Procedures 922, in milliseconds per command. The cylinder high register 930 is used to set the most significant byte of the maximum time allowed for Error Recovery Procedures 932, in milliseconds per command. Subcommand code 8Eh allows the host to disable Time-base Error Recovery Procedure Limitation for write operations (see 546 in FIG. 5).

Referring to FIG. 5, subcommand code 0Fh 550 and 8Fh 548 allow the host to enable or disable AV Write Cache in devices that implement AV Write Cache function. AV write caching enables deferred error reporting. The data from only one write command is cached at a time. This allows deferred write error reporting. When cached write data is not successfully written to the media, the error is reported at the end of the next write command as a deferred error (See Write DMA AV Stream command).

The AV Stream Identify data allows a host to determine if the AV Stream Feature Set is supported. AV Stream configuration data is available after the AV Stream Feature Set is enabled.

Bit 7 of word 83 indicates AV Stream feature set is supported and bit 7 of word 86 indicates AV Stream mode is enabled.

Bit 1 of word 94 indicates Time-base Read ERP Limitation is supported and bit 9 of word 94 indicates Time-base Read ERP Limitation is enabled.

Bit 2 of word 94 indicates Time-base Write ERP Limitation is supported and bit 10 of word 94 indicates Time-base Write ERP Limitation is enabled.

Bit 3 of word 94 indicates AV Write Cache is supported and bit 10 of word 94 indicates AV Write Cache is enabled.

Word 95 indicates the maximum number of AV Streams the device supports.

Word 96 indicates the number of AV Streams currently configured.

Word 97 indicates the maximum number of linked streams per primary stream.

The host shall set AV Stream Addresses for each AV Stream prior to use. The device/head register includes the field DEV which indicates the selected device. FIG. 10 illustrates the inputs 1000 for setting AV stream addresses including registers 1010 and the field DEV 1020 for indicating the selected device.

FIG. 11 illustrates the error outputs 1100 for the AV stream addresses. In FIG. 11, ABRT is set to one if AV Stream mode is disabled or the LBA values specified in the AV Stream Addresses Data (Table 1) are invalid, or if the stream number is in use.

FIG. 12 illustrates a table 1200 for the data format used for setting the AV stream addresses according to the present invention. The Stream Number 1210 indicates the stream initialized by this command. During simultaneous write and read from the same area on the disk several streams may interact. The link field 1244 indicates that the stream being initialized is a subsidiary stream of stream Link Stream Number 1230. The Write AV Stream Pointer and Read AV Stream Pointer are inherited from the Link Stream. The starting 1240 and ending 1242 LBA fields are ignored when Lnk 1244 is set to one. The field Lnk 1244 is set to indicated the new stream is a subsidiary stream linked to the stream Link Stream Number. The Starting LBA 1240 and Ending 1242 LBA are set to the Starting LBA and Ending LBA of stream Link Stream Number 1230 and the values passed are ignored. When Wp 1250 (Wrap) is set to one, the Read AV Pointer and AV Write AV Pointers wrap around.

Command code F9h disables an AV stream enabled with Set AV Stream Addresses. All streams linked to the specified stream are also disabled. FIG. 13 illustrates the inputs for disabling the AV stream 1300. FIG. 14 illustrates the error outputs 1400 when disabling the AV streams. ABRT 1410 is set to one if the AV Stream mode is disabled or the stream specified in the AV Stream number is not enabled.

FIG. 15 illustrates the inputs 1500 for reading the AV stream addresses. Command code FCh 1510 allows the host to retrieve the address range of an AV stream when the AV Stream mode is enabled. The AV Stream Number 1520 indicates which AV Stream addresses are returned. This is valid only when AV Stream mode is enabled. FIG. 16 illustrates the normal outputs 1600 and FIG. 17 illustrates the error outputs 1700. Again ABRT 1710 is be set to one if AV Stream mode is disabled or if AV Stream Number is not valid. The LBA Addresses for the AV Stream indicated in the features register is returned in the format described in the table illustrated in FIG. 12.

FIG. 18 illustrates the inputs 1800 for setting/reading AV pointers. The AV Stream Number 1820 indicates which AV Stream is handled with command code C3h 1822. This is valid only when the AV Stream mode is enabled. The sector count 1824 contains the coded value for the action required. FIG. 19 is a table 1900 illustrating the AV write pointer 1908 or AV read pointer 1910. The value in the sector count 1920 indicates the action to be taken.

FIG. 20 illustrates the normal outputs 2000 for the set/read AV pointers and FIG. 21 illustrates the error outputs 2100 for the set/read AV pointers. ABRT is set to one if AV Stream mode is disabled or if AV Stream Number is not valid.

FIG. 22 illustrates the read DMA AV stream command 2200. Command Ceh 2210 allows the host to read AV Stream data without setting the start LBA using the DMA data transfer protocol. The device reads data from the next LBA of the end LBA of the previous Read AV Stream command which has the same AV Stream Number 2220 specified in Feature register. The device shall wrap around to the first LBA after reading the last LBA of the AV Stream when the host reads the AV Stream data with this command from a stream which was initialized with Wrap set to one. The AV Stream Number 2220 indicates which AV Stream is handled with this command. This is valid only when AV Stream mode is enabled. The LBA 2230, bit 6, is set to one. The Relative Address 2240 is the number of logical blocks to move the Read AV Pointer prior to reading. The Relative Address is a two's complement positive or negative number. FIG. 23 illustrates the normal outputs 2300 for the read DMA AV stream. The PP bit 2310, passed, pointer, is set to one if the offset and count for the command result in the Read AV Pointer passing the Write AV Pointer. The Stream LBA address of the Write AV Pointer is returned on a PP status. FIG. 24 illustrates the error outputs.

FIG. 25 illustrates the write DMA AV stream command. Command CFh 2510 allows the host to write AV Stream data without setting the start LBA using the DMA data transfer protocol. The device writes data from the next LBA of the end LBA of the previous Write AV Stream command which has the same AV Stream Number. 2520 specified in Feature register. The device shall wrap around to the first LBA after writing the last LBA of the AV Stream when the host writes the AV Stream data with this command to a stream which was initialized with Wrap set to one. The AV Stream Number indicates which AV Stream is accessed with this command. This is valid only when AV Stream mode is enabled. The LBA 2530, bit 6, shall be set to one. The Relative Address 2540 is the number of logical blocks to move the Write AV Pointer prior to reading. The Relative Address is a two's complement positive or negative number. FIG. 26 illustrates the normal outputs 2600 for the write DMA AV stream command. The PP bit 2610, Passed Pointer, is set to one if the offset and count for the command result in the Write AV Pointer passing the Read AV Pointer. The Stream LBA address of the Read AV Pointer is returned on a PP status. FIG. 27 illustrates the error outputs 2700 for the write DMA AV stream command. DFER 2710 is set to one if unsuccessful completion of write operation of the cached previous command has occurred.

Figure 28:
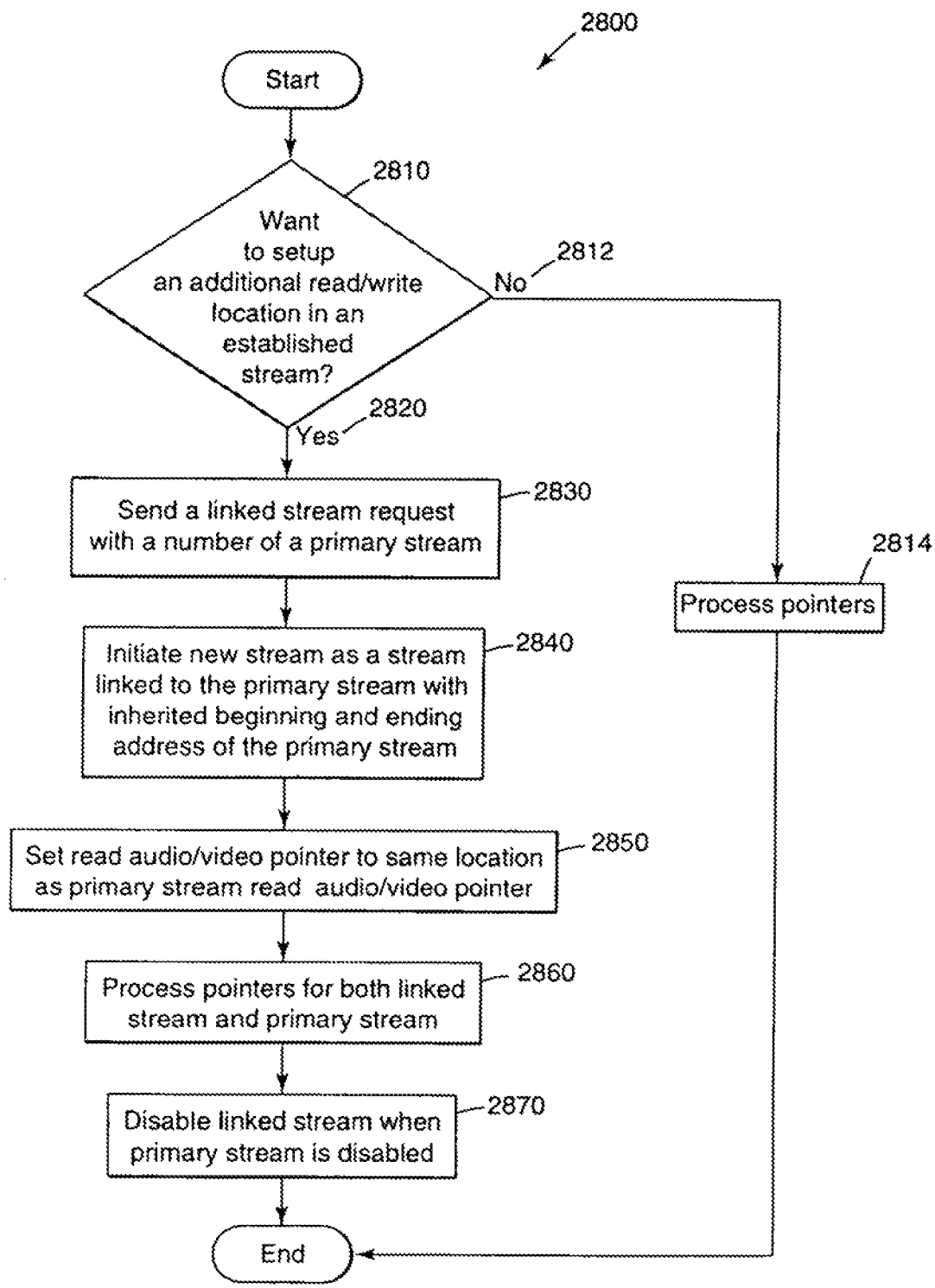
FIG. 28 illustrates a flow chart of a method for providing stream linking in audio/video disk media.

FIG. 28 illustrates a flow chart 2800 of a method for providing stream linking in audio/video disk media. In FIG. 28, a determination is made as to whether additional reading or writing locations in streams are needed 2810. If not 2812, the stream is handled with normal pointer processing 2814. If yes 2820, a linked stream request is sent with a number of a primary stream 2830, The new stream is initiated as a stream linked to the primary stream with a beginning and ending address inherited from the primary stream 2840. As described above, a first stream is initiated, for example, with drive LBA range 2000 to 2999. A second stream is initiated as a linked stream, i.e., linked to the first stream. The second stream is initialized with the same LBA range 2000 to 2999. Then, a read audio/video pointer is set to the same location as the read audio/video pointer of the primary stream 2850. During operation, the pointers for both the linked stream and the primary stream are processed 2860. If the second stream read AV pointer passes the first streams write AV Pointer, then a passed pointer warning is set. A stream may not be linked to a linked stream. Linked streams are disabled when the primary stream is disabled 2870.

The process illustrated with reference to FIG. 28 may be tangibly embodied in a computer-readable medium or carrier, e.g. one or more of the fixed and/or removable data storage devices 168 illustrated in FIG. 1, or other data storage or data communications devices. The computer program 190 may be loaded into the memory 192 or into the storage device 168 to configure the controller 167 of FIG. 1, for execution. The computer program 190 comprise instructions which, when read and executed by the controller 167 of FIG. 1, causes the storage device 168 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A remote multimedia server, comprising:
a mass storage library for storing a plurality of multimedia programs each segmented into at least one audio/video stream;
a transmitter for transmitting the at least one audio/video stream to a communication channel; and
a local media control system, comprising:
a direct access storage device including at least one data storage disk; and a controller for processing for coordinating writing of the at least one audio/video stream received from the communication channel to the data storage disk, and for coordinating reading of the at least one audio/video stream from the data storage disk, the controller providing stream linking in audio/video disk media by sending a linked stream request with a number of a primary stream when additional reading or writing locations in streams are desired in which each stream of locations is a range of addresses on disk media for storing Audio/Video Data in a contiguous area, initiating a linked stream that is linked to the primary stream, setting a pointer for the linked stream to the same location as a pointer for the primary stream, and, during operation, processing the pointers for both the linked stream and the primary stream.

2. The remote multimedia server of claim 1 wherein the setting of a pointer for the linked stream to the same location as a pointer for the primary stream further comprises setting a read audio/video pointer for the linked stream to the same location as the read audio/video pointer of the primary stream.

3. The remote multimedia server of claim 1 wherein the linked stream inherits a beginning and ending address from the primary stream.

4. The remote multimedia server of claim 1 wherein the linked stream and the primary stream each include a read audio/video pointer and a write audio/video pointer.

5. The remote multimedia server of claim 4 wherein a passed pointer warning is set when the linked stream read AV pointer passes the primary stream write AV pointer.

6. The remote multimedia server of claim 1 wherein a stream may not be linked to a linked stream.

7. The remote multimedia server of claim 1 wherein the linked stream is disabled when the primary stream is disabled.

8. The remote multimedia server of claim 1 wherein the linked stream and the primary stream may be read and written to simultaneously.

9. The remote multimedia server of claim 8 wherein the linked stream and the primary stream each include a read audio/video pointer and a write audio/video pointer.

10. The remote multimedia server of claim 9 wherein the read audio/video pointer points to the next sector to read from and the write audio/video pointer points to the next sector to write to.

11. The remote multimedia server of claim 1 further including moving the pointers with a command.

12. A direct access storage device, comprising: at least one data storage disk; and a controller for processing for coordinating writing of the at least one audio/video stream received from the communication channel to the data storage disk, and for coordinating reading of the at least one audio/video stream from the data storage disk, the controller further providing stream linking in audio/video disk media by sending a linked stream request with a number of a primary stream when additional reading or writing locations in streams are desired in which each stream of locations is a range of addresses on disk media for storing Audio/Video Data in a contiguous area, initiating a linked stream that is linked to the primary stream, setting a pointer for the linked stream to the same location as a pointer for the primary stream, and, during operation, processing the pointers for both the linked stream and the primary stream.

13. The direct access storage device of claim 12 wherein the setting of a pointer for the linked stream to the same location as a pointer for the primary stream further comprises setting a read audio/video pointer for the linked stream to the same location as the read audio/video pointer of the primary stream.

14. The direct access storage device of claim 12 wherein the linked stream inherits a beginning and ending address from the primary stream.

15. The direct access storage device of claim 12 wherein the linked stream and the primary stream each include a read audio/video pointer and a write audio/video pointer.

16. The direct access storage device of claim 15 wherein a passed pointer warning is set when the linked stream read AV pointer passes the primary stream write AV pointer.

17. The direct access storage device of claim 12 wherein a stream may not be linked to a linked stream.

18. The direct access storage device of claim 12 wherein the linked stream is disabled when the primary stream is disabled.

19. The direct access storage device of claim 12 wherein the linked stream and the primary stream may be read and written to simultaneously.

20. The direct access storage device of claim 19 wherein the linked stream and the primary stream each include a read audio/video pointer and a write audio/video pointer.

21. The direct access storage device of claim 20 wherein the read audio/video pointer points to the next sector to read from and the write audio/video pointer points to the next sector to write to.

22. The direct access storage device of claim 12 further including moving the pointers with a command.

* * * * *